Oct. 9, 1934.   O. J. DREWS   1,976,604
GARTER FASTENER
Filed Nov. 21, 1932   2 Sheets-Sheet 1
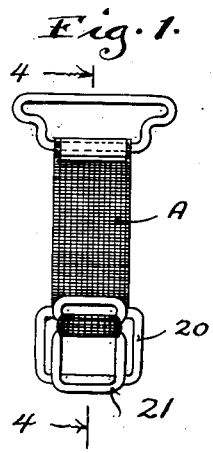
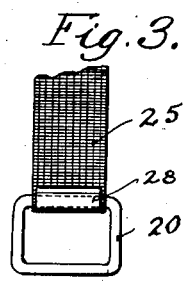
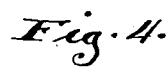
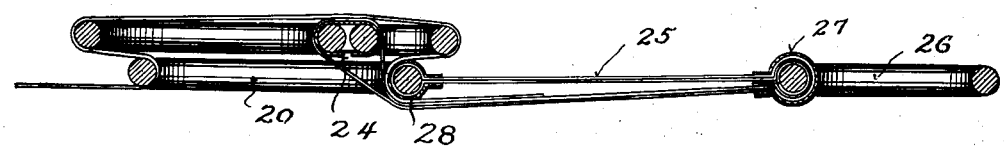
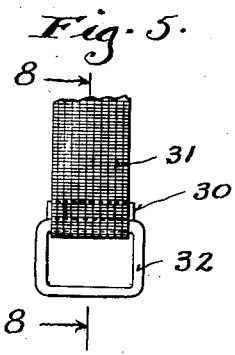
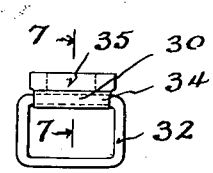
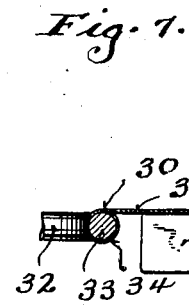
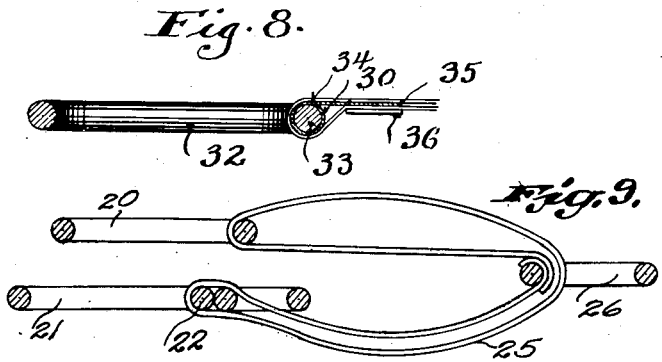
Inventor
Otto J. Drews
By
Attorneys Oct. 9, 1934.　　　O. J. DREWS　　　1,976,604
GARTER FASTENER
Filed Nov. 21, 1932　　　2 Sheets-Sheet 2
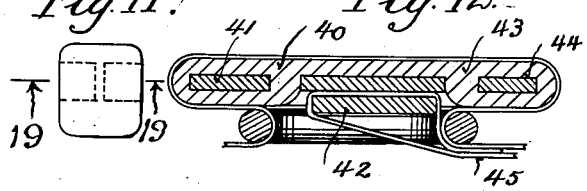
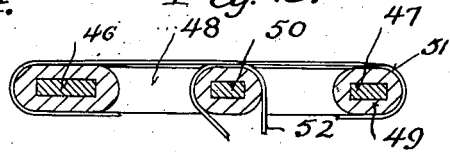
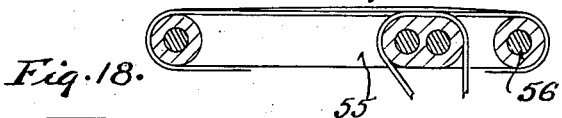
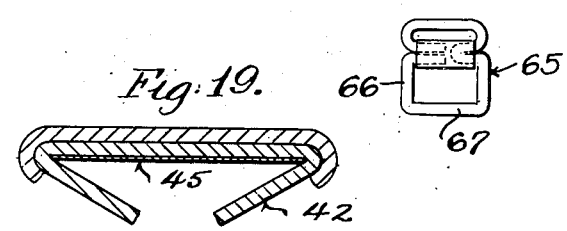
Inventor
Otto J. Drews.

Patented Oct. 9, 1934

1,976,604

UNITED STATES PATENT OFFICE 1,976,604

GARTER FASTENER

Otto J. Drews, Milwaukee, Wis., assignor of one per cent to Irma C. Thuermann, forty-nine per cent to Wilfred J. Thuermann, and one per cent to Irma Drews, all of Milwaukee, Wis.

Application November 21, 1932, Serial No. 643,551

5 Claims. (Cl. 24—197)

This invention appertains broadly to fasteners and is an improvement on my prior Patent No. 1,911,441, issued to me May 30, 1933.

In the mentioned patent, I disclose a pair of suspended rings or loops of a particular form with one of said loops insertable with the material to be held through the other ring or loop.

The present application has for its primary object to provide novel means for constructing the rings and for connecting or suspending said rings whereby the fastener can be easily and quickly made and whereby a more efficient grip will be obtained without injury to the material being held.

Another and more specific object of my invention is to provide novel means for forming the insertable ring or loop from a single length of wire with the supporting tape or fabric connected thereto at the point of connection of the ends of the wire and intermediate the ends of the ring or loop, but to one side of the transverse center of the ring or loop, whereby the insertable loop will be drawn down and back toward the outer ring or loop to clamp the material between the rings or loops, the tape carrying the insertable ring acting to frictionally engage the material being held at one end of the fastener.

A further important object of my invention is to provide novel means for connecting the rings or loops together by the use of a single length of tape and in such a manner that all sewing and the like will be entirely eliminated, metal clips being employed for holding the tape in position.

A further object of my invention is to provide novel means for forming the insertable loop or ring wherein the same will be provided with a sheath or skin of latex or other appropriate material, so that a friction face will be had for firmly gripping the material between the rings or loops and whereby a metal-to-metal contact will be eliminated so as to lessen the possibility of injury to the material being held.

A still further object of my invention is to provide a novel form of clip for connecting the tape or other supporting fabric with the outer loop, whereby said clip will be substantially hidden and enclosed by said tape, so that the hose will not come into engagement with the barrel of the clip.

With these and other objects in view, the invention consists in the novel construction, arrangement and formation of parts, as will be hereinafter more specifically described, claimed and illustrated in the accompanying drawings, in which drawings:—

Figure 1 is a front elevation of my improved fastener showing the inner or insertable loop passed through the outer loop and on top of the outer loop or ring.

Figure 2 is a front elevation of the inner or insertable relatively long ring detached from its supporting tape or fabric.

Figure 3 is a front elevation of the outer loop or ring showing the same connected to its supporting tape or fabric.

Figure 4 is an enlarged diagrammatic view illustrating my improved fastener in use and gripping the material to be held, the view being in longitudinal section.

Figure 5 is a view similar to Figure 3 illustrating a modified form of metal clip for connecting the tape or other supporting fabric with the outer ring or loop.

Figure 6 is a front elevation of the outer ring or loop with a modified form of the clip prior to connection of the tape therewith.

Figure 7 is a detail fragmentary section on an enlarged scale taken on the line 7—7 of Figure 6.

Figure 8 is a detail sectional view taken on the line 8—8 of Figure 5.

Figure 9 is an enlarged diagrammatic view illustrating the method of connecting the receiving member, the insertable member, and the supporting loop together by a single length of webbing, the metal clips being shown removed.

Figure 10 is a front elevation of my fastener showing the use of the modified form of the insertable or inner part of the fastener.

Figure 11 is a detail front elevational view of the modified form of the insertable part of my fastener.

Figure 12 is an enlarged longitudinal sectional view through my fastener embodying the modified form of the insertable part showing the fastener in use.

Figure 13 is a front elevation of my fastener showing a still further modified form of the insertable part thereof, said insertable part being shown positioned through the outer loop and lying on top of the same.

Figure 14 is a front elevation of the insertable part of the fastener illustrated in Figure 13.

Figure 15 is an enlarged longitudinal section through the same, showing said part engaging a piece of material to be held.

Figure 16 is a view similar to Figure 15 showing the inner or insertable ring or loop formed from round wire stock and covered with latex or similar material.

Figure 17 is a view similar to Figure 16 illustrating a slightly modified form of means for connecting the tape or webbing with the inner and insertable loop or ring.

Figure 18 is a front elevation of another slightly modified form of the inner insertable clip or ring showing another method of forming the same from a single length of wire.

Figure 19 is an enlarged detail, transverse section taken on the line 19—19 of Figure 11.

Referring to the drawings in detail, wherein similar reference characters designate the corresponding parts throughout the several views, the letter A generally indicates one form of my improved fastener which is particularly illustrated in Figures 1–4, inclusive.

As shown, my fastener A comprises an outer ring or loop 20 and an inner elongated ring or loop 21. These two rings or loops are preferably formed from wire of the desired gauge and the outer loop 20 is constructed substantially the same as the corresponding loop in my aforementioned patent. This loop 20 is formed wider, but considerably shorter than the loop 21.

The loop 21 is constructed in a novel manner and is formed from a single length of wire and this wire is folded so as to provide a cross bar 22 intermediate the opposite ends of the loop or ring with the ends 23 of the wire lying in close engagement therewith. The cross bar 22 and the ends 23 are enclosed by a sheet metal clip 24, which acts as means for holding the loop or ring in its assembled condition and as a guard for the tape or other suspending fabric. Particular attention is invited to the fact that the metal clip is disposed closer to the inner end of the ring or loop than the outer end of the ring or loop and is thus arranged at one side of the transverse center of said ring. The purpose of this construction will appear as the description proceeds.

As heretofore brought out, one of the salient features of this invention is the novel means employed for connecting the clips 20 and 21 together and this means comprises the use of a single length of tape or similar fabric 25. This fabric is folded about the inner end cross bar of the loop or ring 20, about the fabric receiving loop 26 and about the metal clip 24. Both of the ends of the tape preferably terminate about the fabric receiving loop 26 and a sheet metal clip 27 is pressed about the tape and over the lower cross bar of the fabric receiving loop 26 and firmly clamps the tape in position. A similar sheet metal clip 28 is pressed over the inner cross end bar of the loop or ring 20 about the tape 25, and holds the ring or loop 20 firmly on said tape.

This type of fastener is used identically in the same manner as the fastener in my patent, and the outer loop 20 is placed against the outer face of the fabric and the inner loop 21 is inserted with the fabric through the outer loop until the inner end thereof rides past the inner or rear end of the loop 20, after which the loop 21 is drawn rearwardly. Obviously, the tape or fabric pulling upon the loop or ring 21 at the point mentioned will draw the loop downwardly and rearwardly and thus firmly grip the fabric therebetween.

The supporting lengths of the fabric or tape 25 for the rings 20 and 21 are such that if the ring 21 is inserted through the ring 20 with the material to be held, the greatest pull will be exerted on the tape connected with this ring and thus, the ring 21 is drawn tightly in position. This is made possible by allowing a little slack in the tape supporting the ring 20.

Referring more particularly to the ring 21, it is to be noted that by having the tape or webbing connected adjacent to the rear end of said ring, the ring is formed into a substantially elongated toe portion and a short heel portion. When the ring 21 is inserted with the fabric to be held, a direct leverage is obtained on the ring 21 by the pull on said tape or webbing. Thus, the ring 21 tends to swing on the toe end as a fulcrum and the short heel end is pulled down and back with considerable force to grip the fabric and acts according to the usual law of levers. This obviates all possibility of the fabric working loose irrespective of side strains and the like, in that the intermediate cross bar of link 21 is pulled back against the rear bar of link 20 and prevents displacement of the links or rings relative to one another. The formation of this link 21 with the consequent grip is one of the salient features of the present improvement and of the highest importance.

In Figures 5–8, inclusive, I have illustrated a slightly modified form of clip 30 for connecting the tape 31 with the outer or short loop 32 of the fastener. This clip 30 is formed from sheet metal and has one end of the same rolled about the inner end bar 33 of the loop or ring 32, as indicated by the reference character 34. The clip 30 extends rearwardly from the rolled barrel 34 in the nature of a plate 35 and this plate has formed on its side edges bendable wings 36. In this form of my invention, the tape 31 is folded about the end bar 33 substantially in the same manner as the tape in the form previously described and the inner and outer plies of the tape lie on opposite sides of the plate 35 and the tape completely hides the metal barrel 34 and said plate 35. The wings 36 are now folded inwardly and pressed into gripping contact with the inner ply or fold of the tape, as clearly shown in Figure 8 of the drawings.

This provides an efficient means for connecting the outer ring or loop with its tape and precludes all possibility of the tape shifting relative to one another, and the tape forms a protection or covering for the major portion of the connecting clip.

In some instances, it may be highly desirable to provide a cover for either the inner or insertable member, outer member or both of the fastener. This covering can be formed of any desired substance, such as latex or the like. Obviously, when such a covering is utilized for the inner member of the fastener, the covering will eliminate a metal-to-metal contact and thus, further prevent thread breakage in the stocking or other article being held. Where the covering is formed of latex, a non-slipping surface will be provided and thus, a maximum amount of efficiency and gripping surface is provided.

In Figures 10–12, inclusive, and Figure 19 I have shown the inner or insertable member indicated by the reference character 40 constructed from a metallic plate 41 and this plate has formed on its side longitudinal edges bendable tongues 42. The entire plate 41 with the exception of the tongues 42 and the lower face of the plate immediately below the tongues is covered with a skin of latex or the like 43. If desired, the plate can be provided at spaced points with openings 44, so that the latex or other covering material can flow through the plate to form a perfect bond or union therewith. In connecting the inner or insertable member 40 with its tape or webbing 45, one thickness of the tape or webbing is placed into engagement with the uncovered portion of the plate, after which the tongues 42 are forcibly bent into gripping contact with the tape or webbing 45. This forms an effective means for anchoring the tape or webbing in position.

As illustrated in Figures 13–15, inclusive, I can provide an inner or insertable member 46 formed from a metallic plate 47 which is stamped out to provide parallel longitudinally extending side bars 48, end cross bars 49 and an intermediate cross bar 50. All of these bars 48, 49 and 50 are covered with the skin of latex or other desired material 51. In this particular instance, the supporting tape or webbing 52 is passed directly around the intermediate cross bar 50.

Obviously, where the inner or insertable ring or loop is formed from wire, the same can be also coated or covered with latex or similar material and in Figure 16 I have illustrated such a construction. The wire loop ring is indicated by the reference character 55 and the covering of latex or similar material by the reference character 56.

While in the drawings I have only shown the inner or insertable ring or loop covered with the cushioning material, it is to be understood that the outer receiving loop or ring can also be covered with latex or similar material and in some instances, it may be desirable to utilize a covered outer receiving ring or loop and a bare inner or insertable loop or ring.

I have found that sand-blasting the outer face of the bare insertable ring or loop or leaving the nickel casting unpolished forms an article which not only presents a pleasing appearance, but which also forms a non-slipping surface and thus to a large extent, the use of rubber coated rings can be dispensed with.

While I have shown various means for connecting the webbing or tape with the inner insertable ring or loop, it is to be understood that other means can be provided and in Figure 17, I have illustrated another form of connecting the tape or webbing with the insertable loop or ring. In this figure I have shown the use of a single thickness of tape instead of a doubled tape or webbing, indicated by the reference character 60 and the insertable ring is indicated by the reference character 61. This ring or loop can be constructed in the same manner as the one shown in Figure 2 or in a manner illustrated in Figure 18, which will be hereinafter described.

In this form of my invention, a metal holding clip 62 is folded partially about the intermediate cross pieces of the insertable ring or loop after which the free end of the webbing or tape is placed in position against the clip and the end 63 of the clip is then bent into position into gripping contact with the tape or webbing. The tape or webbing is now folded back over the portion 63 of the clip and over the outer face of the clip and under the rear cross bar 64 of the loop.

In Figure 18 I have illustrated another method of forming the inner member from a single length of wire. This inner member is indicated by the reference character 65 and includes the parallel side bars 66 and end bars 67. Both ends of the wire terminate on the same side of the member and these ends are folded inwardly to provide one-half of the intermediate cross bar. The other half of the intermediate cross bar is formed by bending the opposite side bar inward, as shown.

From the foregoing description, it can be seen that I have provided an efficient and novel means for forming the various units of the fastener and novel means for connecting the units together.

Changes in details may be made without departing from the spirit or the scope of this invention, but what I claim as new is:—

1. In a fabric grip or fastener, an open receiving member, an inner member insertable with the material to be held through the receiving member including a body plate and bendable tongues formed on the side edges thereof, a non-metallic cushion material covering said body plate, and a piece of tape connecting the open receiving member and the inner member together, the tape being placed into engagement with the body plate, said tongues being bent into engagement with the tape.

2. A fabric grip comprising an open-receiving member, an inner member insertable through the receiving member for gripping the material to be held therebetween, a supporting loop arranged in spaced relation to the open-receiving member and the inner member, a single length of tape folded about the supporting loop and about the open-receiving member and the inner member, a metal clip pressed about the supporting loop in engagement with the webbing, and a metal clip pressed around the receiving member in gripping contact with the webbing.

3. A fabric grip comprising an open-receiving member, an inner member insertable through the receiving member for gripping the material to be held therebetween, a supporting loop arranged in spaced relation to the open-receiving member and the inner member, a single length of tape folded about the supporting loop and about the receiving member and the inner member, a metal clip pressed about the supporting loop in engagement with the webbing, and a metal clip pressed about the receiving member in gripping contact with the webbing, the portion of said webbing extending from the inner member to the supporting loop being of less length than that portion of the webbing extending from the receiving member to the supporting loop when said inner member is inserted through the receiving member.

4. A fabric grip comprising an open-receiving ring, an inner member insertable through said receiving ring for gripping the material to be held therebetween, said inner member being formed from a single length of wire including parallel side bars, cross bars, and an intermediate cross bar, said intermediate cross bar being arranged at one side of the transverse axis and adjacent to the inner end cross bar, and means including a flexible tape connecting the receiving ring and the inner member together, the tape being disposed about the intermediate cross bar, as and for the purpose specified.

5. A fabric grip comprising an outer open-receiving ring, an inner member insertable with the material to be held through the receiving ring for gripping said material, means including a flexible webbing for connecting the receiving ring and the inner member together, means on said inner member disposed at one side of its transverse center and adjacent to its rear end for receiving the webbing, whereby when pull is exerted upon the webbing the inner member will be drawn downwardly and rearwardly toward said receiving ring so as to firmly grip the material between the receiving ring and the inner member.

OTTO J. DREWS.